Nov. 6, 1923.

T. G. DADE 1,473,084

WHEEL

Filed May 14, 1923

INVENTOR
Thomas G. Dade.
BY Arthur C. Brown
ATTORNEY

Patented Nov. 6, 1923.

1,473,084

UNITED STATES PATENT OFFICE.

THOMAS G. DADE, OF ST. MARYS, OHIO.

WHEEL.

Application filed May 14, 1923. Serial No. 638,860.

*To all whom it may concern:*

Be it known that I, THOMAS G. DADE, a citizen of the United States, residing at St. Marys, in the county of Auglaize and State of Ohio, have invented certain new and useful Improvements in Wheels, and do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to wheels and particularly to wheels having wooden tires made up of blocks so disposed that the fibers of the wood are radial of the wheel.

The primary object of the invention is to provide an improved form of wheel adapted to receive a wooden tire consisting of blocks fastened together in circular series and adapted to be placed upon the rim of the wheel and conveniently fastened thereto.

The preferred construction of the wheel is illustrated in the accompanying drawings, in which Fig. 1 is a side elevational view of a wheel constructed in accordance with my invention.

Figure 1:
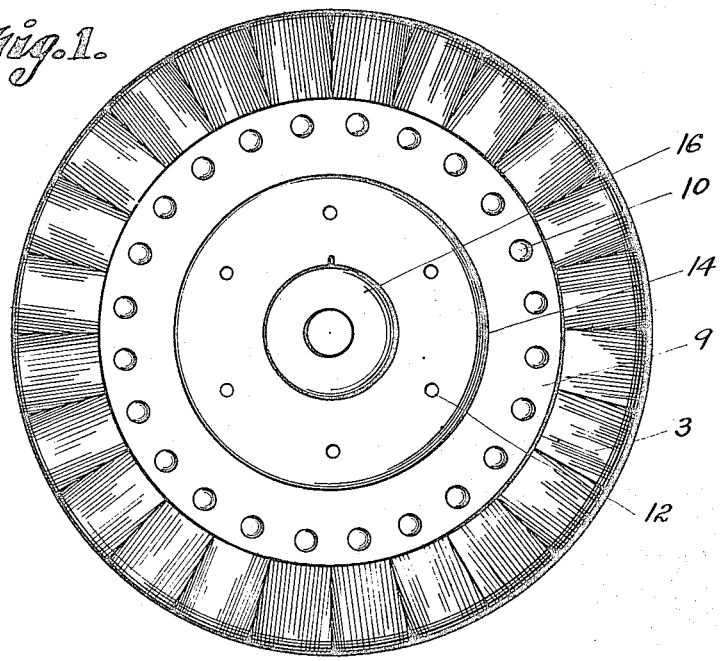
Figure 2:
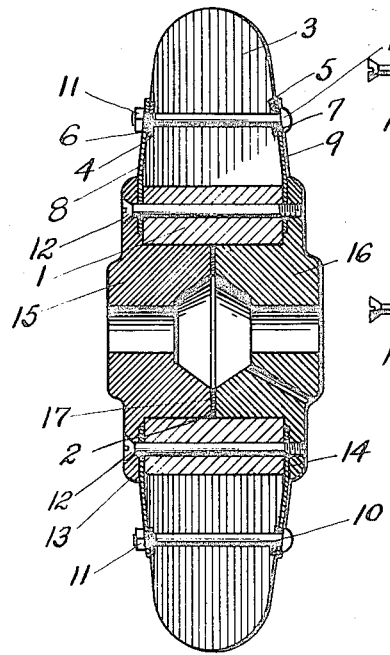
Fig. 2 is a vertical, cross sectional view through the same.
Figure 3:
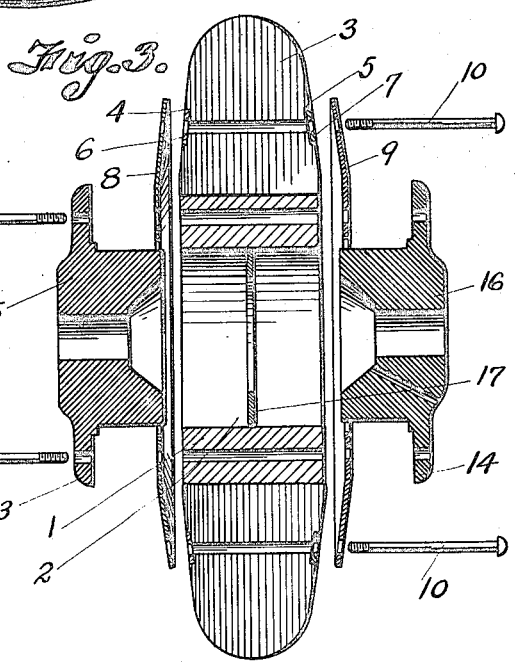
Fig. 3 is a vertical, cross sectional view through the parts separated ready to be assembled.

The wheel is illustrated as comprising a rim 1 having a central hub receiving bore or opening 2 to receive the hub members to be hereinafter described. The rim 1 receives the tire which comprises a plurality of blocks 3 arranged end to end in circular series and has arcuate side grooves 4 and 5 which register so a circular groove is formed on both sides of the tire. The grooves receive the countersunk fastening rings 6 and 7 which are adapted to be securely fastened to the blocks.

The tire is held in place by side plates 8 and 9 through which bolts 10 may project near the peripheries of the side plates, the bolts passing through the rings 4 and 5 and through the blocks 3 and they are held in place by nuts 11.

The side plates or disks 8 and 9 are also fastened to the wheel by bolts 12, which pass through the flanges 13 and 14 of the hub members 15 and 16. The hub members are received in the opening 2 and between them is a spacing washer or ring 17.

The bolts 12 pass through the flange of one hub member and screw into the flange of the other hub member so that the two hub members can be drawn together to permit the flanges 13 and 14 to bear against the fastening rings or side plates 8 and 9 and since the outer edges of the side plates are fastened to the tire and the inner edges of the side plates are fastened to the rim by the flanges 13 and 14, it will be apparent that a rigid unitary wheel is provided.

The side reinforcements consisting of the rings 4 and 5 and side plates 8 and 9 so brace the sides of the blocks that liability of the blocks splitting or chipping will be eliminated. The strain is directed radially of the blocks so that the fibers resist the strain longitudinally. This is an important feature in wheel construction since it tends to lengthen the effective life of the tire and prolong the usefulness of the wheel.

What I claim and desire to secure by Letters Patent is:

1. A wheel comprising a rim, a tire about the rim, side plates bearing against the rim and overlapping the tire, hub sections received within the rim and having flanges overlapping the side plates, and means for securing the side plates and hub sections together.

2. A wheel comprising a rim, a tire about the rim, side plates bearing against the rim and overlapping the tire, hub sections filling the rim and having flanges overlapping the side plates, and means for fastening the hub sections to the rim.

3. A wheel comprising a rim, a tire about the rim, side plates bearing against the rim and overlapping the tire, hub sections filling the rim and having flanges overlapping the side plates, means for fastening the hub sections to the rim, and bolts passing through the side plates and through the tire.

In testimony whereof I affix my signature.

THOMAS G. DADE.